(12) United States Patent
Hucker et al.

(10) Patent No.: US 10,821,527 B2
(45) Date of Patent: Nov. 3, 2020

(54) METHOD OF MANUFACTURING A CRANKSHAFT

(71) Applicant: GM GLOBAL TECHNOLOGY OPERATIONS LLC, Detroit, MI (US)

(72) Inventors: Scott A. Hucker, Ortonville, MI (US); Joseph G. Lovasz, Ortonville, MI (US); Dale E. Murrish, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 79 days.

(21) Appl. No.: 16/150,912

(22) Filed: Oct. 3, 2018

(65) Prior Publication Data

US 2020/0108455 A1 Apr. 9, 2020

(51) Int. Cl.
| | |
|---|---|
| *B23B 49/04* | (2006.01) |
| *B23C 3/06* | (2006.01) |
| *B21K 1/08* | (2006.01) |
| *G01M 1/26* | (2006.01) |
| *F16C 3/10* | (2006.01) |

(52) U.S. Cl.
CPC ............... *B23C 3/06* (2013.01); *B21K 1/08* (2013.01); *B23B 49/04* (2013.01); *G01M 1/26* (2013.01); *B23B 2215/20* (2013.01); *B23P 2700/07* (2013.01); *F16C 3/10* (2013.01); *F16C 2220/02* (2013.01); *F16C 2220/66* (2013.01)

(58) Field of Classification Search
CPC combination set(s) only.
See application file for complete search history.

(56) References Cited

U.S. PATENT DOCUMENTS

| | | |
|---|---|---|
| 1,750,608 A | 3/1930 | Summers |
| 1,761,945 A | 6/1930 | Van Degrift |
| 1,822,860 A | 9/1931 | Summers et al. |
| 2,219,795 A | 10/1940 | Van Degrift |
| 2,315,998 A | 4/1943 | Haeger |
| 2,329,835 A | 9/1943 | Hope et al. |
| 2,344,753 A | 3/1944 | Van Degrift |
| 2,746,299 A | 5/1956 | Federn et al. |
| 4,446,732 A | 5/1984 | Schoenfeld |
| 4,779,316 A * | 10/1988 | Cherry .................. F16F 15/283 74/603 |
| 4,852,405 A | 8/1989 | Schonfeld |

(Continued)

*Primary Examiner* — Jun S Yoo
(74) *Attorney, Agent, or Firm* — Cantor Colburn LLP

(57) ABSTRACT

A method of manufacturing a crankshaft includes the steps of: (1) forming a crankshaft blank via a first half and a second half; (2) measuring a plurality of surface variations between a predetermined surface in a first region and a corresponding predetermined surface in a second region of the crankshaft blank; (3) calculating centering offset data based on the plurality of surface variations; (4) machining a pair center holes based on the centering offset data; (5) machining a counterweight and a journal relative to the pair of center holes to produce a partially machined crankshaft; (5) milling and grinding the partially machined crankshaft to produce a finished machined crankshaft; and (6) rotating the finished machined crankshaft typically on the outermost main journals in a final balancing machine and then modifying the counterweights to eliminate undesirable vibration generated during the rotation and engine operation.

13 Claims, 9 Drawing Sheets

(56) References Cited

U.S. PATENT DOCUMENTS

| | | | | |
|---|---|---|---|---|
| 5,408,745 A * | 4/1995 | Tomiyama | ............... | B23P 15/00 |
| | | | | 29/888.08 |
| 2010/0101085 A1* | 4/2010 | Miura | ....................... | F16C 3/08 |
| | | | | 29/888.08 |
| 2010/0179675 A1* | 7/2010 | Yoshimoto | ............... | G01M 1/24 |
| | | | | 700/98 |
| 2011/0085865 A1* | 4/2011 | Yoshimoto | ............... | B23B 49/04 |
| | | | | 408/1 R |
| 2012/0259452 A1* | 10/2012 | Yoshinnoto; Akihiro | ................... | |
| | | | | G05B 19/402 |
| | | | | 700/186 |
| 2015/0231710 A1 | 8/2015 | Nagata et al. | | |
| 2015/0306681 A1* | 10/2015 | Yoshimoto | ............... | B23B 49/04 |
| | | | | 408/1 R |
| 2016/0033006 A1* | 2/2016 | Leverington | ......... | F16F 15/322 |
| | | | | 700/279 |

\* cited by examiner

METHOD OF MANUFACTURING A CRANKSHAFT

TECHNICAL FIELD

The present disclosure relates to a method of manufacturing a crankshaft which minimizes vibration when operating.

BACKGROUND

An engine's crankshaft converts reciprocating linear movement of a piston into rotational movement about a crank axis to provide torque to propel a vehicle, such as but not limited to a train, a boat, a plane, or an automobile. Crankshafts are a vital part of an engine, and are a starting point of engine design. Crankshaft design affects the overall packaging of the engine, and thereby the total mass of the engine. Accordingly, minimizing the size and/or mass of the crankshaft reduces the size and mass of the engine, which has a compounding effect on the overall size, mass and fuel economy of the vehicle.

The crankshaft includes at least one crank pin journal that is offset from the crank axis, to which a reciprocating piston is attached via a connecting rod. Force applied from the piston to the crankshaft through the offset connection therebetween generates torque in the crankshaft, which rotates the crankshaft about the crank axis. The crankshaft further includes at least one main bearing journal disposed concentrically about the crank axis. The crankshaft is secured to an engine block at the main bearing journals. A bearing is disposed about the main bearing journal, between the crankshaft and the engine block.

The crankshaft is typically formed or manufactured by a casting process, such as but not limited to a green sand casting process or a shell mold casting process, which uses cast iron to form the crankshaft. Alternatively, the crankshaft may be forged from a steel alloy. Steel is stronger than cast iron, and therefore is a more desirable material to use for crankshafts. However, the forging process is more costly than the casting process and steel is more expensive to machine.

In general, traditional methods to manufacture and balance a crankshaft result in rather costly scrap material and/or extra mass in order to accurately balance the crankshaft. Failure to accurately balance the crankshaft results in undesirable vibration when the crankshaft is rotating in operation. Referring now to FIG. 1, a traditional method of manufacturing a crankshaft with mass centering is shown in the form of a flow chart. First, rough center holes of a crankshaft blank are identified by rotating/spinning the crankshaft blank ("mass centering"). Step 112. Thereafter, using one or more types of cutting devices through the bulk of the machining line used in Step 114, rough main journals and rough pin journals of the crankshaft blank are cut with reference to the rough center holes. Subsequently, using either the mass centering or geometric centering process, the final balance of the crankshaft is corrected (by modifying the arms/counterweights if possible) in Step 116 at a final balance machine by drilling into the outer surfaces of the crankshaft. However, a high scrap rate is experienced using the aforementioned method given that despite exhaustive efforts to modify the arms/counterweights, it is not possible to balance the crankshaft so that the resulting vibration (which indicates the imbalance) falls within acceptable limits.

The aforementioned issue of balancing crankshafts is further exacerbated by new lighter weight crankshaft designs for improved engine response (less rotating inertia) and improved fuel economy (no unnecessary mass). Such crankshaft designs have minimal access and increased limitations for drilling radial holes in the aforementioned final balance machine, thus requiring a separate mass centering machine before the initial machining center drills the rough centers. Traditional geometric centering is a process where the crankshaft is clamped on the front and rear (outermost) main journals in order to machine the center holes. However, the traditional geometric centering process is inadequate, due to not providing a means to adjust the centering based on vibration feedback from the Final Balancing operation. If the crankshaft is not sufficient balanced (unacceptable levels of vibration are experienced at the final balance machine), the crankshaft manufacturing process will have a high scrap rate and/or a longer machining cycle time, Given that the condition of unevenness in thickness and geometric variations of a crankshaft blank tends to vary in accordance with the manufacturing lot of the crankshaft blanks, every time the manufacturing lot of the crankshaft blanks is changed, scrapped products are inevitably produced resulting in increased cost and needless waste. Regardless, it is to be understood that there are multiple processes for primary forming of crankshaft blanks, including additive machining and other processes. Raw parts can be made from a variety of mostly ferrous materials like steel and nodular iron, or other materials or alloyed materials, such as but not limited to titanium, aluminum and tungsten. Forming methods include forging with a single die/casting half parting line, forge and twist, and casting by a variety of methods, such as but not limited to green sand, lost foam, shell mold, permanent mold and precision sand with and without chills.

Moreover, time associated with moving the crankshaft between several machines results in increased cost, additional machine to machine communications requirements and reduced efficiency. Therefore, there is a need for a less expensive method for mass centering or optimizing each crankshaft's condition at the final balance operation, which eliminates the need to have a separate machine to measure the unbalance (axis of inertia) of the crankshaft blank.

SUMMARY

The present disclosure provides a cost-effective and efficient method of manufacturing a crankshaft in order to determine a bias effect which may have occurred when crankshaft blank was initially formed so as to efficiently and accurately identify the center holes for the crankshaft thereby reducing material waste and unnecessary cost, One embodiment of the manufacturing method includes the steps of: (1) molding a crankshaft blank via a first half or casting half and a second half or casting half; (2) measuring a plurality of surface variations at predetermined surfaces which correspond between a first region and a second region of the crankshaft blank; (3) calculating "centering offset data" based on the differences found between the plurality of predetermined surfaces ("to cover the plurality of surface variations"); (4) machining center holes based on the centering offset data; (5) machining a plurality of journals, mounting/sealing/locating surfaces, counterweights, and journals relative to the center holes to produce a machined crankshaft; and (6) a final balance operation rotating the machined crankshaft typically on the outermost main journals and modifying (usually via radial drills) the counterweights to minimize vibration generated during the rotation and engine operation.

In the aforementioned embodiment of the disclosure, the first region of the crankshaft is formed by the first half while the second region of the crankshaft is formed by the second half. The first region is integral to the second region at a parting line which is disposed in the region where the first half and the second half meet. Although desirable for the parting line to be planar, in the case of 3-cylinder, V6 and some V8's, the raw part is twisted imparting additional complexity. It is further understood that the plurality of surface variations may include but is not limited to an x-axis variation, a y-axis variation, a z-axis variation, and/or an angular variation—between the first and second regions. In measuring the plurality of surface variations at predetermined surfaces, the predetermined surfaces are preferably, but not necessarily flat surfaces and are also preferably, but not necessarily, located on the arms or counterweights of the crankshaft. The faces and other parts of the crankshaft arms and counterweights may or may not be machined when the main journals and pin journals are being manufactured. This leaves some parts of the arms and counterweights unmachined. Counterweight outward radial surfaces may be machined (topped), and counterweight faces may be machined (cheeked). Moreover, the unmachined parts of the crankshaft arms generally have flat surfaces with complementing regions between the first region and the second region. The predetermined surfaces in the first region are measured relative to corresponding predetermined surfaces in the second region. The measurements may be optionally be performed via a plurality of probes which are components of the measuring-cutting fixture. Based on the plurality of surface variations identified between the corresponding predetermined surfaces, the method may further include the step of calculating centering offset data which are used to identify an accurate, optimized center hole location by first locating the "machine-identified center holes" using either a geometric centering fixture design, or a side-locate mass centering fixture design or another method and then subsequently modifying the location of the "machine-identified center holes" according to the measured variations at least in the x-axis, y-axis, z-axis and/or in an angular directions.

It is further understood that the aforementioned step of machining the center holes may subsequently include the steps of machining a crankshaft length, a post end, and a flange end of the crankshaft via the same machine (measuring-cutting fixture) in which the measurement steps (measuring surface variations) were previously performed. Accordingly, once the (probe) measurements are completed and then the machining steps are completed in the measuring-cutting fixture of the first machine, after other machining operations the crankshaft may then be transferred to a final balancing machine where the machined crankshaft may be dynamically rotated typically on the outermost main journals to identify any undesirable vibration. In the event undesirable vibration is identified, the counterweights in the machined crankshaft may be modified at the final balancing machine to reduce or eliminate the undesirable vibration. The crankshaft journals may be polished before or typically after the final balancing operation. The aforementioned method does not require a user to correct the crankshaft center holes given that a mass bias effect (centering offset data) for the crankshaft is calculated before crankshaft center holes, pin journals, main journals, and counterweights are machined.

In yet another embodiment of the present disclosure, a cost-effective and efficient method of manufacturing a crankshaft includes the steps of: (1) providing a crankshaft blank formed by a first half and a second half; (2) measuring and machining the crankshaft blank in a measuring-cutting fixture to produce partially machined (lengths and rough centers) (3) transferring the finished machined crankshaft to a final balancing machine; and (4) rotating the finished machined crankshaft) in the final balancing machine and modifying the counterweights at the final balancing machine based on a vibration data output from the final balancing machine to produce a balanced crankshaft. The balanced crankshaft is a crankshaft blank which is balanced (any vibration falls within an acceptable limit) and where the center holes, pin journals, main journals, and counterweights have been machined. It is understood that the first half and the second half may either be dies or casting halves. For example, dies may optionally be implemented in a forging operation (first die and second die) to form a crankshaft blank or casting halves (first casting half and second casting half) may be implemented in a casting operation to form the crankshaft blank. It is understood that, prior to transferring the finished machined crankshaft to the final balancing machine, the following interim steps may be performed: (a) transfer crankshaft from measuring cutting machine to multiple milling machines and rough turning machines to rough cut counterweights, pin journals, and main journals to produce a rough crankshaft; and (b) subsequently grinding the rough crankshaft via a plurality of grinding machines to produce a finished machined crankshaft.

With respect to the foregoing example, non-limiting embodiment, the step of measuring of measuring and machining the crankshaft blank may further include the steps of: (a) measuring a variation between a predetermined surface in the first region to a corresponding predetermined surface in the second region; (b) calculating centering offset data based on the plurality of surface variations between the identified predetermined surfaces; and (c) machining center holes based on the centering offset data. Similar to the first embodiment, it is understood that the first region is formed by the first half or casting half and the second region is formed by the second half or casting half wherein the first region is integral to the second region at a parting line. Moreover, the step of measuring the variation between the predetermined surfaces produces a data measurement set (in the form of centering offset data) which indicates the biasing effect of unmachined surfaces of the crankshaft blank. The centering offset data includes an x-axis variation, a y-axis variation, and/or an angular variation where each value may be negative, positive or zero. Moreover, when centering offset data is calculated, it is understood that the centering offset data is used to accurately identify the center hole locations for the crankshaft via the following steps: locating the "machine-identified center hole;" and then modifying the location of the "machine-identified center hole" by the x-axis variation, the y-axis variation, the z-axis variation and/or the angular variation. The step of machining the center holes further includes the subsequent steps of machining a crankshaft length, a post end, and a flange end of the crankshaft in regions relative to the machined center holes.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

FIGS. 4A and 4B show the two sides of the part.

Like reference numerals refer to like parts throughout the description of several views of the drawings.

DETAILED DESCRIPTION

Figure 1:
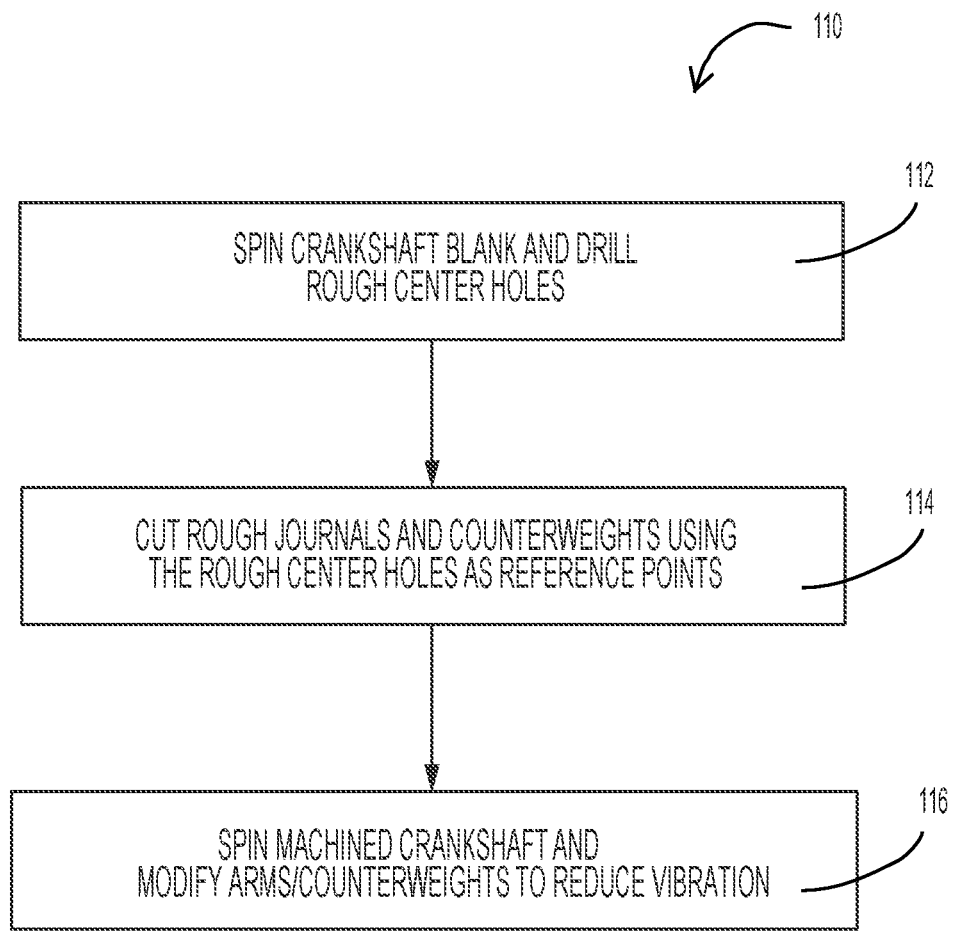
FIG. 1 is a flow chart which illustrates a traditional method of manufacturing a crankshaft.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 2:
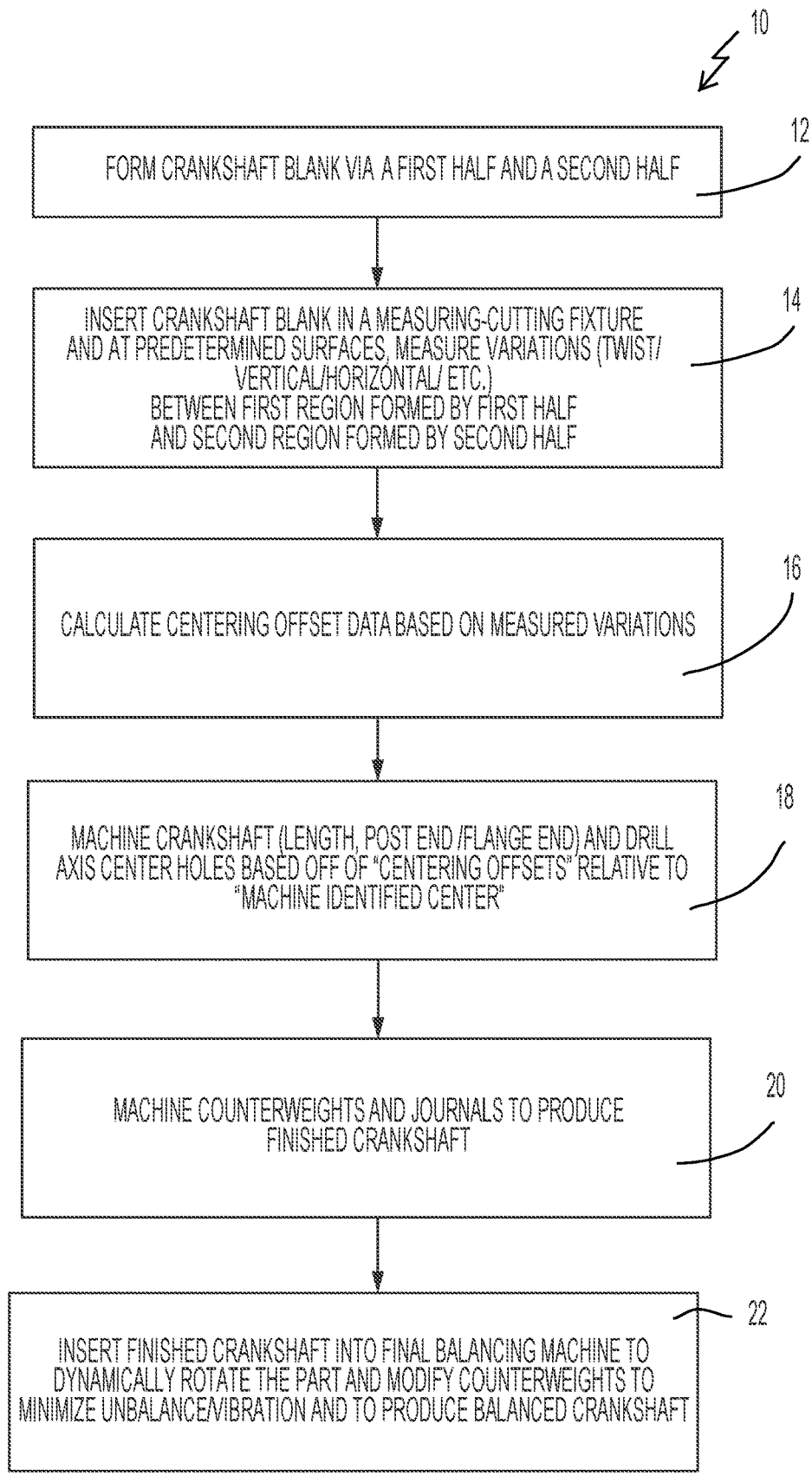
FIG. 2 is a flow chart which illustrates an improved method of manufacturing a crankshaft in accordance with various embodiments of the present disclosure.
Figure 3:
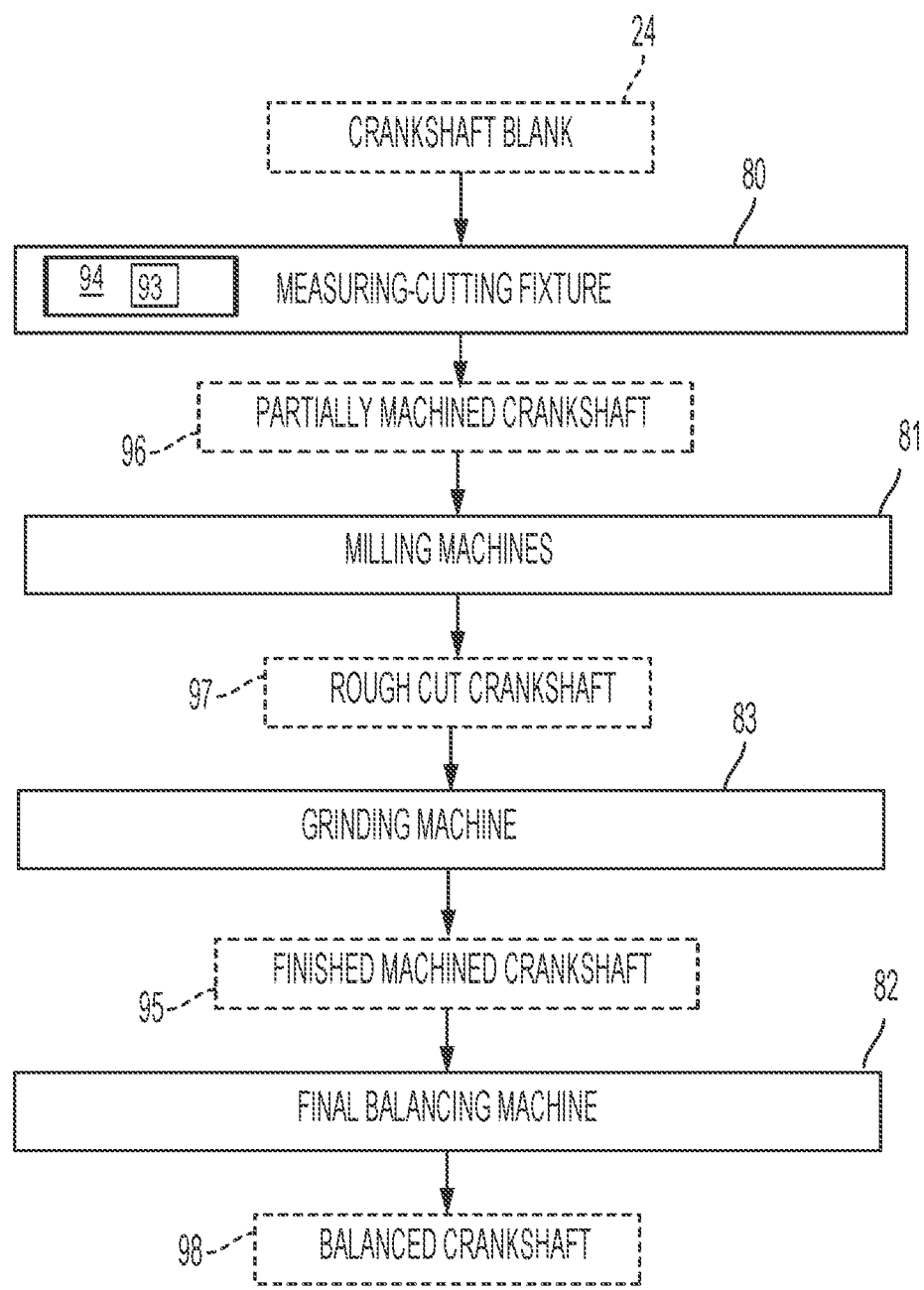
FIG. 3 is a schematic view of the machines implemented in conjunction with the method shown in FIGS. 2 and 6.

Referring now to FIG. 2 and FIG. 3, one embodiment of a cost-effective and efficient method of manufacturing a crankshaft is shown in the form of a flow chart. This manufacturing method 10 includes the steps of: (1) forming a crankshaft blank 24 via a first die or casting half (cavity) 42 and a second die or casting half (cavity) 46; (Step 12) (2) measuring a plurality of surface variations 86, 88, 90 (FIG. 5B) between corresponding predetermined surfaces 48, 50 at a first region 40 and at a second region 44 of the crankshaft blank 24; (Step 14) (3) Using the measurement (from Step 14) to calculate their effective result by calculating centering offset data 84 based on the plurality of surface variations 86, 88, 90; (Step 16) (4) machining center holes 62 into the crankshaft blank 24 based on the centering offset data 84; (Step 18) (5) machining a counterweight and a journal relative to the center holes 62 to produce a partially machined crankshaft 96; (Step 20) and (6) rotating the partially machined crankshaft 96 about the center holes 62 and modifying the counterweights 72 to minimize vibration generated during the rotation. (Step 22)

With respect to the aforementioned embodiment and the subsequent embodiments of the present disclosure, the crankshaft blank 24 may be maintained in a fixed position (not rotated) in a measuring-cutting machine 80 while the crankshaft blank 24 is measured and machined. Moreover, it is understood that the measurement step (Step 14) may be performed for each individual crankshaft blank, or the measurement step (identified in Step 14) may be performed for a lot (group) of crankshaft blanks (using the average measurements as a non-limiting example) formed from a specific set first and second halves. It is also understood that for all embodiments of the present disclosure, measuring surfaces could also optionally be located on a machined surface such as but not limited to a journal or a counterweight or on a to-be-machined surface. Moreover, the measurement steps disclosed in the present disclosure can optionally involve contact measurement (via LVDT probes for example), or alternatively non-contact measurement such as scanning or using inductive probes. Also, the measurement steps disclosed in the present disclosure may optionally (alternatively) be performed outside of the "measuring-cutting machine" or cutting machine—such as when a crankshaft is being manufactured for a V6 engine.

Figure 4A:
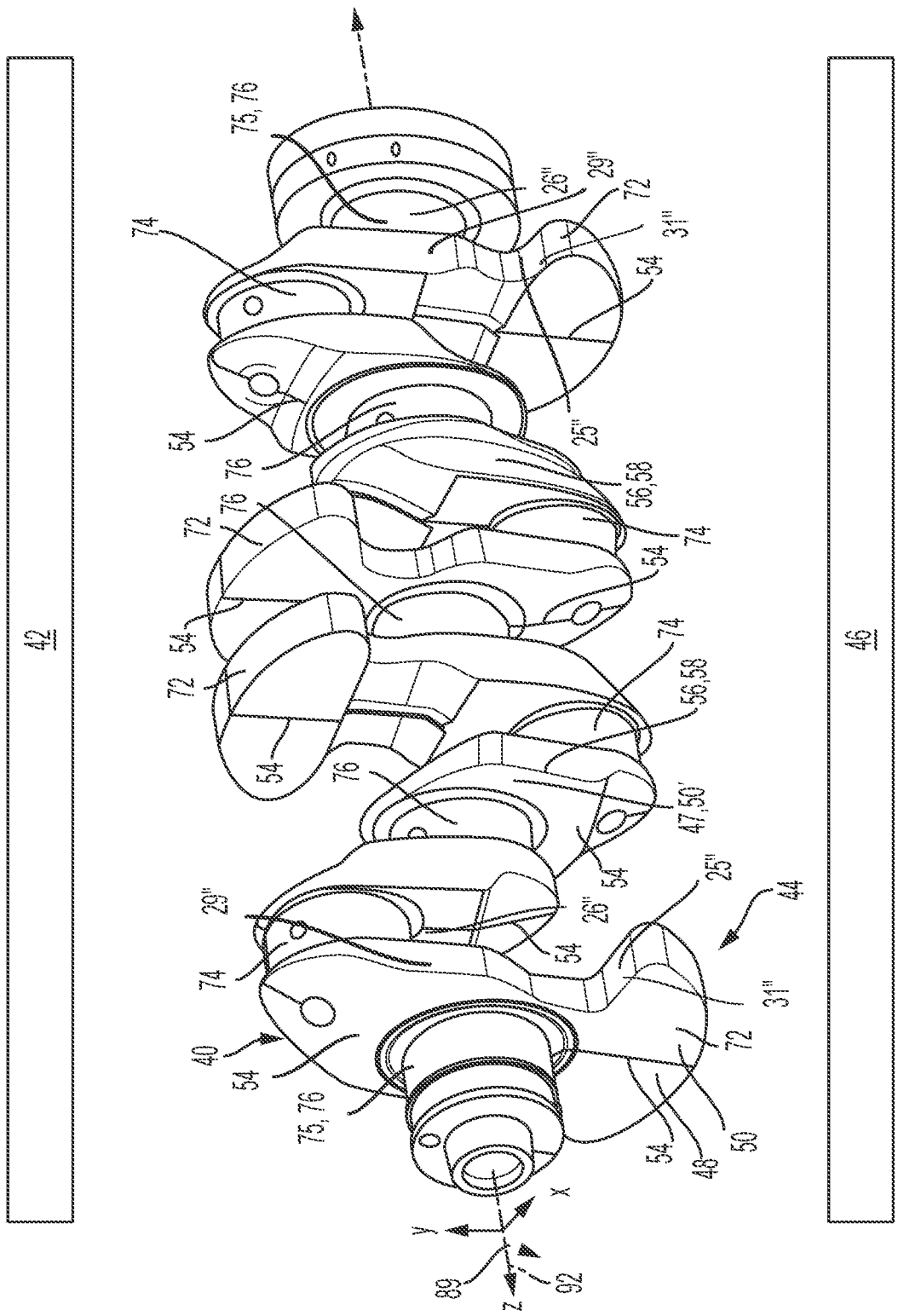
FIG. 4A is an isometric view of a crankshaft blank for a four-cylinder engine with the second region shown in the forward position together with example, non-limiting predetermined measurement surfaces identified in accordance with the present disclosure.
Figure 4B:
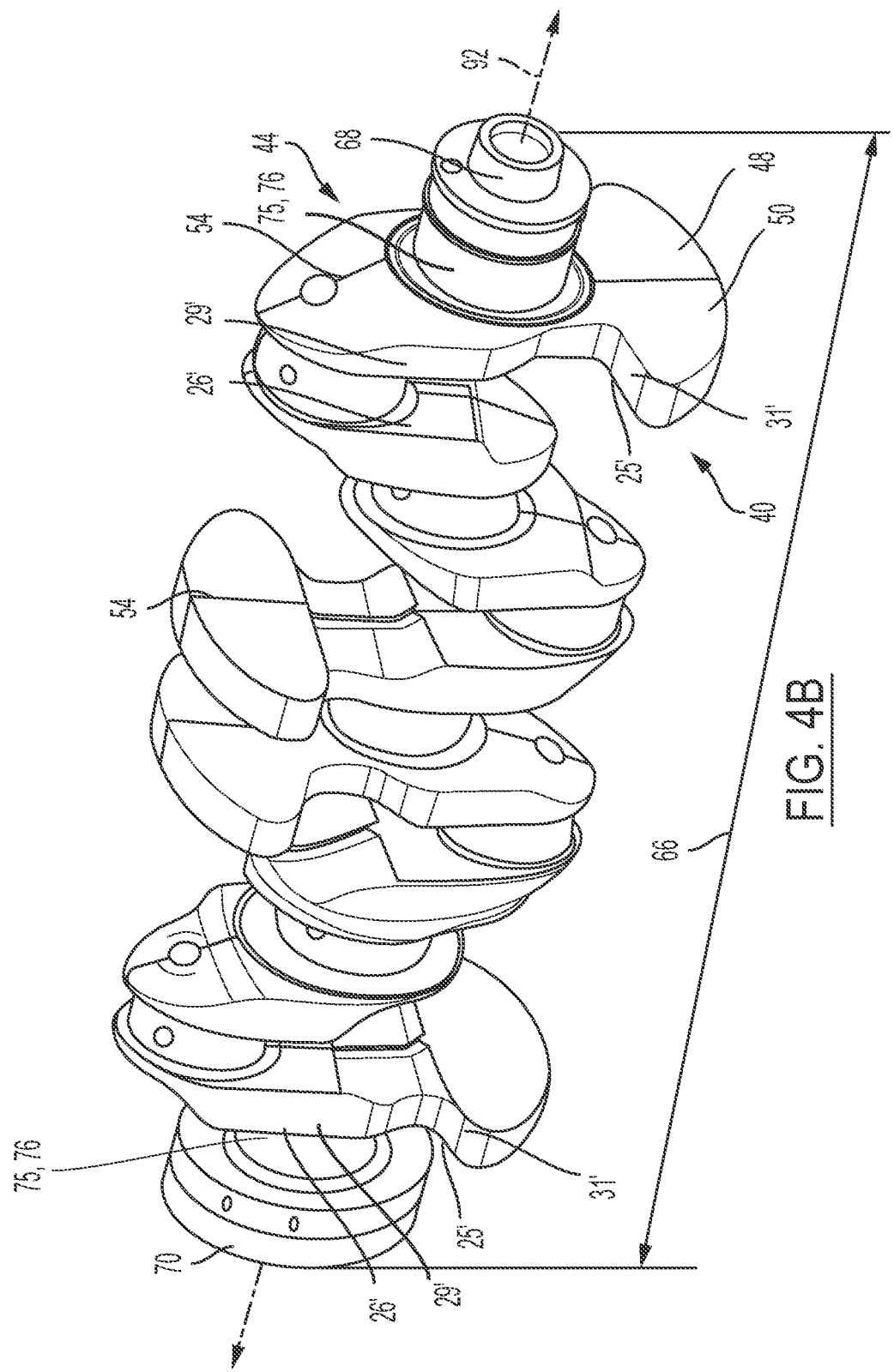
FIG. 4B is an isometric view of the crankshaft blank in FIG. 4A for a four-cylinder engine with the first region shown in the forward position together with example, corresponding measurement surfaces identified in accordance with the present disclosure. Together.
Figure 4C:
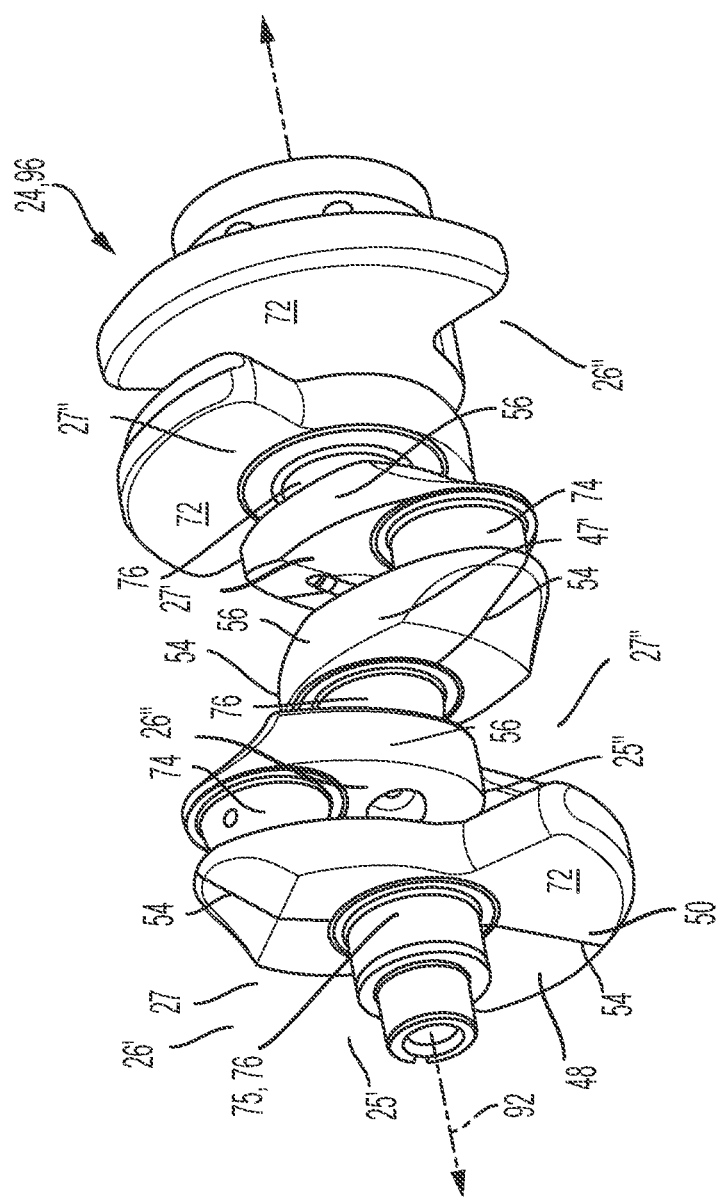
FIG. 4C is an isometric view of a crankshaft blank for a three-cylinder engine with a third set of predetermined measurement surfaces identified in accordance with the present disclosure.

Referring now to FIGS. 4A-4B, the first and second regions 40, 44 of a crankshaft blank 24 are shown. In FIG. 4A, when no tilt is detected in the crankshaft blank 24 for a four-cylinder engine, it is therefore possible to only use four measuring probes 25 when performing the measurement steps. (See Step 14). However, when some tilt (rotation about X-axis) is detected in the crankshaft blank 24 for a four-cylinder engine, and the method 10 of the present disclosure may require additional measuring probes 25 (See FIGS. 4A-4B) wherein these four probes 25 determine any angular differences between the predetermined surface 48 at the first region 40 and the corresponding predetermined surface 50 at the second region 44. In FIG. 4C, a crankshaft blank 24 is shown for a three-cylinder engine where the middle portion 52 of the hot crankshaft blank 24 is twisted approximately 120 degrees immediately upon removing the crankshaft blank 24 from the first and second dies or cast halves 42, 46. Therefore, with respect to the crankshaft blank 24 in the non-limiting example of FIG. 4C, six measurement probes 26 and 27 are used to perform the measurement steps wherein the measurements determine whether there is an angular variation 90 between the first and second regions 40, 44. In addition, four more probes 25 measure the tilt present in the first and second regions before the twisting step.

Regardless of the number of measuring probes 25 and 26 used, the first region 40 of the crankshaft blank 24 is formed by the first die or casting half 42 while the second region 44 of the crankshaft blank 24 is formed by the second die or casting half 46 as shown in FIGS. 4A-4C. The first region 40 is integral to the second region 44 at a parting line 54. The parting line 54 also indicates where the first region 40 meets the second region 44. As shown in the example shown in FIG. 4, the arms 56 of the crankshaft are shown in the cross-hatched regions 64. It is understood that, in the example provided, the arms 56 of the crankshaft will not be subject to any machining throughout the manufacturing process, and therefore, the cross-hatched regions 64 also illustrate raw surfaces 58 which will not be subject to any machining. However, it is understood that other crankshaft blanks 24 may be machined in some, but not all, surfaces for the arms 56 of the crankshaft blank 24.

Therefore, with respect to the step of measuring a plurality of surface variations 86, 88, 89, 90 it is understood that at least an x-axis variation 86, a y-axis variation 88, z-axis variation 89 and/or angular variation 90 may be measured at corresponding points taken from each of the first and second regions 40, 44 wherein: (1) the predetermined surface 47 falls within a raw surface region 58; and (2) the predetermined surface 47 is a flat surface such as those shown in FIGS. 4A-4C. It is understood that the corresponding points are surface locations (which mirror each other across the parting line 54) on each of the first and second regions 40, 44 as shown in FIGS. 4A-4C. With reference back to FIG. 2, based on the plurality of surface variations 86, 88, 90 which are measured between corresponding predetermined surfaces 47, the method may further include the step of calculating centering offset data 84 which is used to accurately identify a center hole location 92. In order to accurately identify a pair of center hole locations 62, the method of the present disclosure indicates that the "machine identified center holes" 60 are initially located by the measuring-cutting fixture's 80 clamp or retaining structure and then modifying the location of the "machine identified center hole" 60 by the calculated/measured x-axis variation 86, the y-axis variation 88, and/or angular variation 90 to accurately identify the location for the crankshaft center hole location 62. It is understood that the each of the x-axis variation 86, the y-axis variation 88, and/or angular variation 90 may be a positive number, a negative number, or zero. Moreover, the centering offset data 84 is calculated at a control module 94 for the measuring-cutting fixture 80. The "machine-identified center hole" locations are identified by using the locations of the measuring-cutting fixture 80 clamps used to retain/secure the crankshaft blank's 24 main journal. As indicated, the x-axis variation 86, the y-axis variation 88, and/or angular variation 90 are then used against (measured against) the locations of the "machine-identified center holes 62" to accurately identify and machine the locations for the pair of crankshaft center holes 62. By adjusting the location for the pair of center holes 62 with the x-axis variation 86, the y-axis variation 88, and/or angular variation 90, the biasing effect (or biasing of the material mass) formed in the forging/casting process is resolved so that the biasing of the material mass will no longer cause undesirable vibration.

It is further understood that the aforementioned step of machining the pair of center holes 62 (and corresponding axis bore 63) further includes the subsequent steps of machining a crankshaft length 66, a post end 68, a flange end 70 of the crankshaft, possible axial faces (cheeking) of arms and counterweights 72, pin journals 74 and main journals 76 relative to the already partially machined crankshaft 96 center holes 62. As shown in FIG. 3, the same machine ("measuring-cutting fixture 80") may be used to perform all of the aforementioned measurement steps and machining steps. Accordingly, once all of the measuring and machining steps are completed in the measuring-cutting fixture 80 (FIG. 3), the partially machined crankshaft 96 may then be transferred other machines and then to a final balancing machine 82 where the partially machined crankshaft 96 may be then get dynamically rotated typically on the outermost main journals 75 about center holes 62 to identify any undesirable vibration which may fall outside of an acceptable range. In the event undesirable vibration is identified, the counterweights 72 in the partially machined crankshaft 96 may be modified in certain regions (such as at the counterweights) at the final balancing machine 82 (FIG. 3) to reduce or eliminate the undesirable vibration. Once the crankshaft is modified to eliminate the undesirable vibration, the crankshaft is provided in the form of a balanced crankshaft 98. As demonstrated, the example non-limiting method of the present disclosure enables a process in which center holes 62 do not have to be drilled and then re-drilled, or corrected. Rather, the present disclosure enables a user to accurately identify and machine the pair of center holes 62 (and the corresponding axis bore 63) at the front end of the process in a single operation (instead of iterative operations). Moreover, the aforementioned methods of the present disclosure also enables a user to accurately identify and then drill the center holes 62 for the crankshaft without having to dynamically rotate the crankshaft in a costly machine. That is, the use of expensive machines which dynamically rotate the crankshaft is reduced thereby reducing cost as well as wear-and-tear to such machines, and integration costs with the rest of the machining line.

Figure 5A:
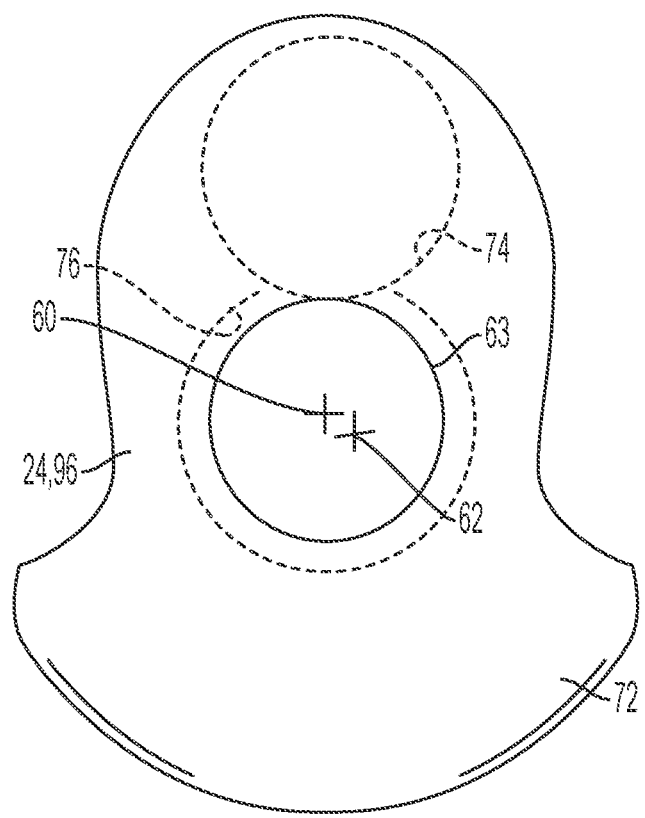
FIG. 5A illustrates a schematic side view of any one of the crankshafts in FIGS. 4A-4C.
Figure 5B:
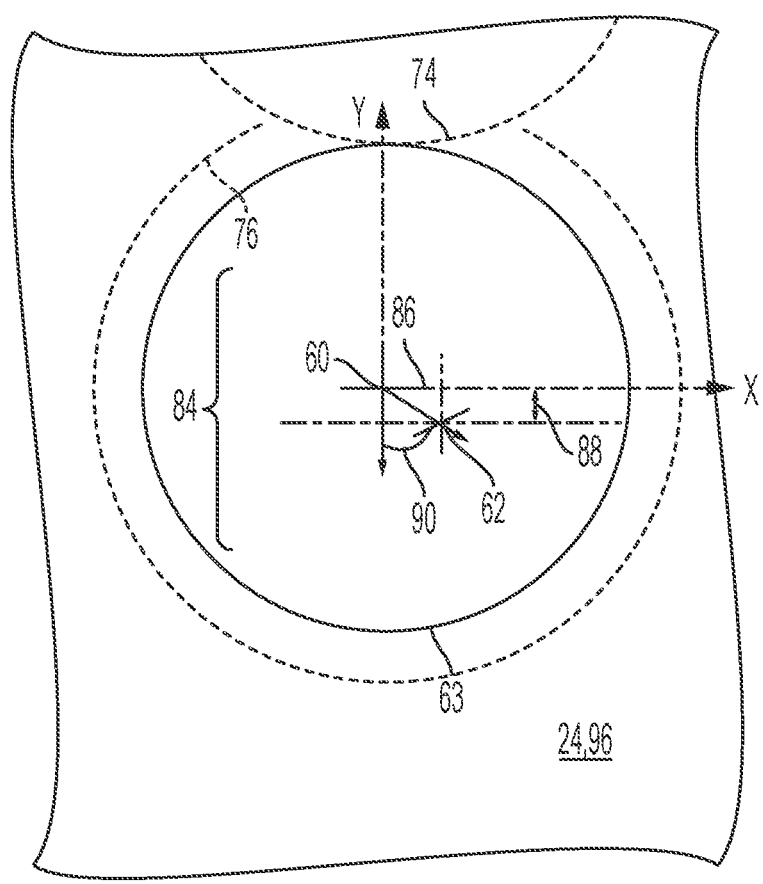
FIG. 5B illustrates an enlarged view of the center hole/main journal region wherein center offset data measurement results are shown relative to the machine-identified center holes and the crankshaft center holes.
Figure 6:
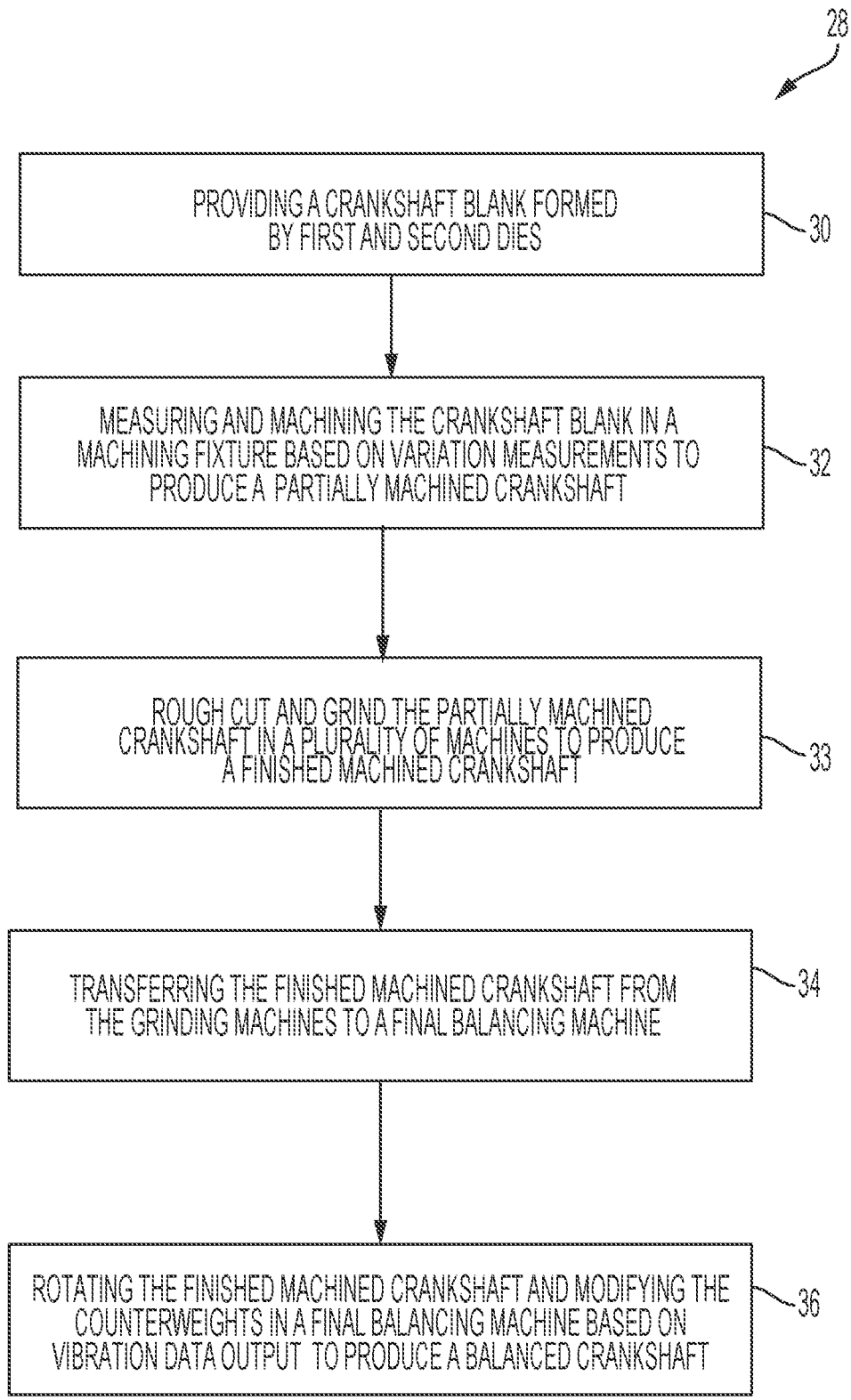
FIG. 6 is a flow chart which illustrates another improved method of manufacturing a crankshaft in accordance with various embodiments of the present disclosure.

Referring now to FIGS. 3 and 5, another embodiment of the present disclosure wherein a crankshaft is manufactured. This example, non-limiting method 28 shown in FIG. 6 includes the steps of: (1) providing a crankshaft blank 24 formed by a first die or casting half (cavity) 42 and a second die or casting half (cavity) 46; Step 30 in FIG. 6, see also FIGS. 4A and 4B; (2) measuring and machining the crankshaft blank 24 in a measuring-cutting fixture 80 to produce a partially machined crankshaft 96; Step 32 in FIG. 6, see also FIG. 3, (3) transferring the partially machined crankshaft 96 from the measuring-cutting fixture 80 to a final balancing machine 82; Step 34 in FIG. 6; see also FIG. 3, and (4) rotating the partially machined crankshaft 96 in the final balancing machine 82 in order to modify the counterweights 72 at the final balancing machine 82 (based on a vibration data output from the partially machined crankshaft 96) to produce a finished and balanced crankshaft 98. Step 36 in FIG. 6; see also FIGS. 3, and 4A-4C.

With respect to the foregoing example, non-limiting embodiment, the step of measuring of measuring and machining the crankshaft blank 24 (Step 32 in FIG. 6) may further includes the steps of: (a) measuring a plurality of surface variations 86, 88, 90 between a predetermined surface 47, 48 in the first region 40 and a corresponding predetermined surface 47, 50 in the second region 44; (b) calculating centering offset data 84 ("the biasing effect" 84 or "data measurement set" 84) based on the plurality of surface variations 86, 88, 90 (via a computational model 93 in the control module of the measuring-cutting machine); and (c) machining center holes 62 based on the centering offset data 84. Similar to the first embodiment, it is understood that the first region 40 of the crankshaft blank 24 is formed by the first half 42 (die or casting half) and the second region 44 of the crankshaft blank 24 is formed by the second half 46 (die or casting half) wherein the first region 40 is integral to the second region 44 at a parting line 54. Similar to the first embodiment, it is understood that example pairs of predetermined surfaces 29' and 29", 31' and 31", 47' and 47" of FIGS. 4A, 4B and 4C refer to pairs of corresponding predetermined surfaces on the first and second regions 40, 44. In addition, measuring probes 25' and 25", 26' and 26", 27' and 27" also are paired across the parting line 54. Moreover, the step of measuring the variation produces a data measurement set 84 ("centering offset data 84) having any one or more of an x-axis variation 86, a y-axis variation 88, a z-axis variation, 89 and/or angular variation 90. Moreover, when the centering offset data 84 is calculated at a control module 94 via a computational model 93 in a control module 94 (FIG. 3) of the measuring-cutting fixture 80, it is therefore understood that the pair of center hole locations 62 are accurately identified by performing the following steps: locating the "machine-identified center hole" based on the location of the fixture clamps used for the crankshaft blank's 24 outermost main journals 75 and then modifying the locations of the "machine-identified center hole" by any combination of the x-axis variation 86, the y-axis variation 88, z-axis variation 89 and/or angular variation 90 to accurately identify the correction locations for the pair of center holes 62. As previously indicated, by adjusting the location for the pair of center holes 62 with data 84 relating to any combination of the x-axis variation 86, the y-axis variation 88, the z-axis variation 89 and/or angular variation 90, then the unintended biasing effect (or biasing of the material mass) formed in the forging/casting process is resolved so that the unintended biasing of the material mass from the forging/casting process of the crankshaft blank 24 will no longer cause undesirable vibration or excessive scrap rates from the inadequate balance drill correction envelope.

Once the center hole locations 62 are accurately identified, the center holes 62 are machined into the crankshaft blank's 24 outermost main journals 75, and then based on the already machined center holes 62, the measuring-cutting fixture 80 machines/forms the crankshaft length 66, a post end 68, a flange end 70 of the crankshaft, the pin journals 74 and the main journals 76. As indicated, once the process steps are completed at the measuring-cutting fixture 80, the partially machined crankshaft 96 is transferred from the measuring-cutting fixture 80 to a plurality of machines to mill and grind the crankshaft. Once the milling and grinding of the crankshaft is completed, a finished machined crankshaft (element 95 in FIG. 3) is produced and is then transferred to the final balancing machine 82 (see FIG. 3). The finished machined crankshaft is dynamically rotated at the final balancing machine 82 in order to measure any vibration. If the measured vibration falls outside of an acceptable range, then the counterweights 72 may be modified via the balancing machine so that any undesirable vibration is eliminated (or so that the resulting vibration falls within an acceptable range).

Therefore, referring again to FIG. 6, a cost-effective and efficient method 28 of manufacturing a crankshaft includes the steps of; (1) providing a crankshaft blank formed by a first half and a second half; Step 30. (2) measuring and machining the crankshaft blank in a measuring-cutting fixture to produce partially machined (lengths and rough centers); Step 32 (3) transferring the machined crankshaft from the measuring-cutting fixture to at least one of a miffing machine 81 and a grinding machine 83 to produce a finished machined crankshaft (element 95 in FIG. 3) (see element 95 in FIG. 3); Step 33 in FIG. 6, (4) transferring the finished machined crankshaft (element 95 in FIG. 3) to a final balancing machine; Step 34 and (5) rotating the finished machined crankshaft (element 95 in FIG. 3) in the final balancing machine and modifying the counterweights at the final balancing machine based on a vibration data output from the final balancing machine to produce a balanced crankshaft. Step 36. It is understood that the balanced crankshaft is a crankshaft blank which has been balanced (any vibration falls within an acceptable limit) and where the center holes, pin journals, main journals, and counterweights have been machined.

It is understood that the first half and the second half may either be dies or casting halves. For example, dies may optionally be implemented in a forging operation (first die and second die) to form a crankshaft blank, or casting halves (first casting half and second casting half) may be implemented in a casting operation to form the crankshaft blank. It is understood that, prior to transferring the finished machined crankshaft (element 95 in FIG. 3) to the final balancing machine, the following interim steps may be performed: (a) transfer crankshaft from measuring cutting machine to multiple milling machines and rough turning machines to rough cut counterweights, pin journals, and main journals to produce a rough crankshaft; and (b) subsequently grinding the rough crankshaft via a plurality of grinding machines to produce a finished machined crankshaft (element 95 in FIG. 3).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of manufacturing a crankshaft comprising the steps of:
    forming a crankshaft blank via a first half and a second half or a first casting half and a second casting half;
    measuring a plurality of surface variations between a first region and a second region of the crankshaft blank in a measuring-cutting fixture while maintaining the crankshaft blank in a fixed position;
    calculating centering offset data based on the plurality of surface variations;
    machining a pair of center holes based on the centering offset data;
    machining a plurality of arms, counterweights and journals relative to the center holes to produce a partially machined crankshaft;
    milling and grinding the partially machined crankshaft to produce a finished machined crankshaft; and
    rotating the machined crankshaft and then modifying the counterweights to reduce undesirable vibration.

2. The manufacturing method as defined in claim 1 wherein the first region of the crankshaft blank is formed by the first half, and the second region of the crankshaft blank is formed by the second half, and the first region is integral to the second region at a parting line.

3. The manufacturing method as defined in claim 1 wherein the plurality of surface variations of the two halves each include an x-axis variation, a y-axis variation, a z-axis variation and an angular variation relative to a fixed machining coordinate system.

4. The manufacturing method as defined in claim 1 wherein the step of calculating centering offset data includes the step of accurately identifying a center hole location by first locating a pair of machine identified center holes via the measuring-cutting fixture and then modifying the location of the pair of machine identified center holes by the x-axis variation, the y-axis variation, the z-axis variation, and/or angular variation.

5. The manufacturing method as defined in claim 1 wherein the step of machining the pair of center holes is followed by the steps of machining a crankshaft length, a post end, and a flange end of the crankshaft.

6. The manufacturing method as defined in claim 1 wherein the steps of measuring surface variations, calculating centering offset data, and machining the center holes are performed via a measuring-cutting fixture.

7. The manufacturing method as defined in claim 1 wherein after machining other crankshaft features the steps of dynamically rotating the finished machined crankshaft and modifying the counterweights are performed via a final balancing machine.

8. The manufacturing method as defined in claim 1 wherein the step of measuring the plurality of surface variations includes measuring a variation between a predetermined surface in the first region of the crankshaft blank to a corresponding predetermined surface in the second region of the crankshaft blank.

9. A method of manufacturing a crankshaft comprising the steps of:
    providing a crankshaft blank formed by a first half and a second half;
    measuring and machining the crankshaft blank in a measuring-cutting fixture to produce mass centering without a separate machine including measuring a variation between a predetermined surface in a first region formed by the first half to a corresponding predetermined surface in a second region formed by the second half with the first region being integral to the second region at a parting line, calculating centering offset data based on the variation between the predetermined surface in the first region to the corresponding predetermined surface in the second region, machining a pair of center holes based on the centering offset data, and then subsequently machining a plurality of journals, arms and counterweights relative to the pair of center holes;
    transferring the machined crankshaft from the measuring-cutting fixture to at least one of a milling machine and a grinding machine to produce a finished machined crankshaft;
    transferring the finished machined crankshaft to a final balancing machine; and
    rotating the machined crankshaft in the final balancing machine and modifying the counterweights based on a data output from the machined crankshaft to produce a balanced crankshaft.

10. The manufacturing method as defined in claim 9 wherein the step of measuring a variation produces a data measurement set having an x-axis variation, a y-axis variation, a z-axis variation and an angular variation.

11. The manufacturing method as defined in claim 10 wherein the step of calculating centering offset data includes identifying a center hole location via locating a machine identified center hole via the measuring-cutting fixture and then subsequently modifying the location of a machine identified center hole by the x-axis variation, the y-axis variation, the z-axis variation and the angular variation.

12. The manufacturing method as defined in claim 9 wherein the step of machining the pair of center holes further includes the steps of machining a crankshaft length, a post end, and a flange end of the crankshaft after the pair of center holes are machined.

13. The manufacturing method as defined in claim 9 wherein after machining other crankshaft features the steps of dynamically rotating the finished machined crankshaft and modifying the counterweights are performed via a final balancing machine.

* * * * *